W. F. GREEN.
WATER GAGE.
APPLICATION FILED FEB. 4, 1913.
1,138,285.
Patented May 4, 1915.
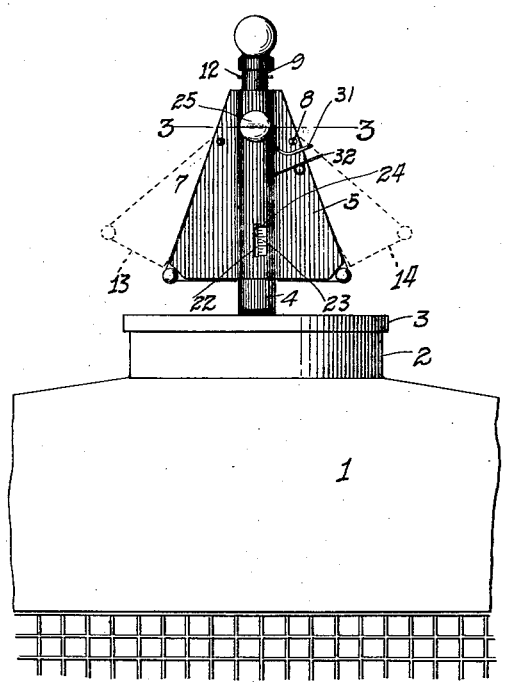
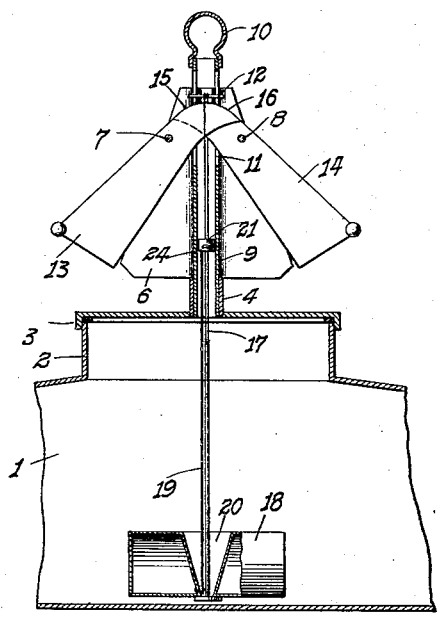
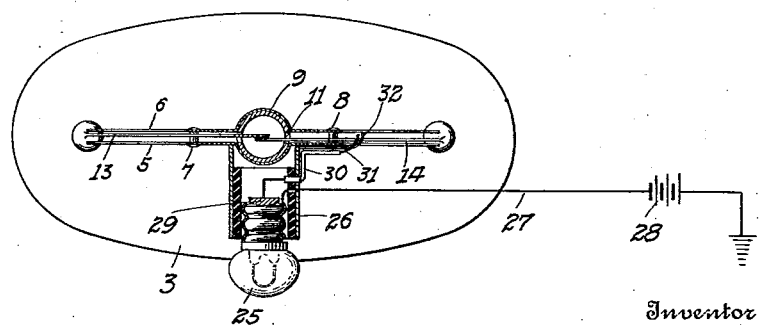
Witnesses
Frank H. Carter
F. A. Stock
Inventor
William F. Green
By Harry C. Schroeder
Attorney

UNITED STATES PATENT OFFICE.

WILLIAM F. GREEN, OF MODESTO, CALIFORNIA.

WATER-GAGE.

1,138,285.  Specification of Letters Patent.  Patented May 4, 1915.

Application filed February 4, 1913. Serial No. 746,159.

*To all whom it may concern:*

Be it known that I, WILLIAM F. GREEN, a citizen of the United States, residing at Modesto, in the county of Stanislaus and State of California, have invented certain new and useful Improvements in Water-Gages, of which the following is a specification.

The object of my invention is to indicate the water level in radiators of automobiles so that when the supply of water is nearing depletion the driver or occupant of the car will be able to determine this fact and will be signaled so that a new supply may be obtained.

It is one of the objects of my invention to provide an improved signal which will be visible in daylight and also a signal which will be visible at night.

The device of my invention also contemplates a night signal which will be initiated or set into action upon actuation of the day signal.

The device of my invention will be more fully described in connection with the accompanying drawing, and will be more particularly pointed out in and by the appended claim.

In the drawing:—Figure 1 is a view of a radiator and the device of my invention viewed from the driver's seat, the parts being shown in elevation. Fig. 2 is a similar view with the parts shown in section. Fig. 3 is a horizontal sectional view on line 3—3 of Fig. 1.

Like characters of reference designate similar parts throughout the different figures of the drawing.

As shown, 1 designates a radiator tank having an opening 2 adapted to be closed by a top or cap 3.

Mounted in the cap 3 is a shield support, preferably tubular in form, as indicated at 4. Shields 5 and 6 are mounted on said support and are preferably trapezodial in form. The shields 5 and 6 are disposed in spaced relation with respect to each other and may be connected by pivots 7 and 8, in the form of rivets. Within the support 4, is mounted a guide, preferably in the form of a tube 9, which may extend upwardly between the shields 5 and 6, and above the same, and which may be provided with a suitable ornamental top 10. The guide tube 9 may be slotted at 11 and an actuator bar 12, having ends guided in said slots 11, may be disposed in said guide tube, as indicated in Fig. 2.

Signal elements, preferably in the form of blades 13 and 14, are pivotally mounted at 7 and 8 and are adapted to normally lie between the shields 5 and 6 so as to be invisible to the occupants of the car when in a normal position. The signal blades 13 and 14 may be provided with a color arrangement such as would graphically distinguish them from the color of the shield 5.

The upper ends of the blades 13 and 14 are rounded, as at 15 and 16, and said rounded ends are disposed in overlapping relation with respect to each other, and are of such proportions as to lie in overlapping relation with respect to each other, even when in their normal position. It will also be seen that the overlapping ends of the blades 13 and 14 are disposed inwardly with respect to the pivots 7 and 8 on which they are mounted. The actuating bar 12 is adapted for engagement with the rounded ends 15 and 16 of the blades 13 and 14 so as to expand the same outwardly from the shields 5 and 6, as indicated in dotted lines in Fig. 1 and in full lines in Fig. 2, when the actuator bar 12 is moved downwardly in the guide tube 9. The actuator bar 12 is provided with connections, which may be in the form of flexible wires 17, with a float 18, disposed in the radiator tank 1. When the water in the tank 1 becomes depleted, and the level sinks, the weight of the float 18 will be sufficient to exert enough pressure on the actuator bar 12 to overcome friction of movement of the parts, and spread the signal blades 13 and 14 as indicated in Fig. 2. An indicator rod 19 extends through an inserted centrally disposed conical open portion 20, of the float 18, and upwardly in the guide tube 9 wherein it is provided with an enlarged head 21. The guide tube 9 is provided with an opening 22, having a graduated margin 23, abreast of which an index or pointer 24, moves. By means of this arrangement, the driver can at all times determine the water level.

In the event that darkness or fog might prevent the blades 13 and 14 from being seen by the driver, I may provide an electric signal which is preferably cut into and out of circuit by the blades 13 and 14, or one thereof.

As illustrated, an incandescent lamp 25 is mounted upon the guide tube 9 in a socket 26. One pole of the lamp is connected by a wire 27, with a source of supply of current 28, which latter is grounded through the frame of the machine. The other pole of the lamp is connected by a contact 29 with a wire 30, the latter being insulated from the signal frame and having a terminal end 31 lying in the path of the blade 14. A second contact 32, also lies in the path of the blade 14 and is grounded on the frame. It will thus be seen that when the signal blades or elements 13 and 14 are spread, as indicated in Fig. 2, circuit will be closed so as to cause the electric lamp 25 to glow.

While I have herein shown and described one specific form of my invention, I do not wish to be limited thereto except for such limitations as the claim may import.

I claim:—

The combination with an automobile tank having a filling aperture, of a cover for said filling aperture, a water level signal mounted on said cover and comprising in combination, a vertical tubular member provided with slots in the upper portion thereof, shields carried by said tubular member, signal blades pivoted to said shields and having curved overlapping portions, said blades being adapted to normally be concealed by said shields, an actuating bar extending through the slots in the vertical tubular member and in operative engagement with the said pivoted signal blades, a float disposed in said tank, a vertical rod carried by said float, and flexible members connecting the upper end of said rod with said actuating bar whereby the signal blades are moved into their extended position.

In testimony whereof I affix my signature in presence of two witnesses.

WILLIAM F. GREEN.

Witnesses:
 FRANK H. CARTER,
 S. NELSON.